United States Patent
Dooley et al.

(10) Patent No.: US 7,623,547 B2
(45) Date of Patent: *Nov. 24, 2009

(54) INTERNET PROTOCOL ADDRESS MANAGEMENT SYSTEM AND METHOD

(75) Inventors: Michael Earl Dooley, Exton, PA (US); Steven John Thompson, Strafford, PA (US); John Joseph Ramkawsky, Royersford, PA (US); Timothy J. Rooney, East Norriton, PA (US)

(73) Assignee: BT INS, Inc., Santa Clara, CA (US)

( * ) Notice: Subject to any disclaimer, the term of this patent is extended or adjusted under 35 U.S.C. 154(b) by 398 days.

This patent is subject to a terminal disclaimer.

(21) Appl. No.: 11/076,730

(22) Filed: Mar. 9, 2005

(65) Prior Publication Data

US 2006/0126629 A1   Jun. 15, 2006

Related U.S. Application Data

(63) Continuation-in-part of application No. 11/011,473, filed on Dec. 13, 2004.

(51) Int. Cl.
*H04J 3/16* (2006.01)

(52) U.S. Cl. .................. 370/466; 370/392; 709/226
(58) Field of Classification Search .............. None
See application file for complete search history.

(56) References Cited

U.S. PATENT DOCUMENTS

| | | | |
|---|---|---|---|
| 4,783,739 A | 11/1988 | Calder | |
| 5,247,634 A | 9/1993 | Cline et al. | |
| 5,544,093 A | 8/1996 | Ogawa | |
| 7,035,261 B2 * | 4/2006 | Ogawa et al. | 370/392 |
| 7,054,322 B2 | 5/2006 | D'Annunzio et al. | |
| 7,519,991 B2 | 4/2009 | Brustoloni | |
| 2003/0163584 A1 | 8/2003 | Anderson et al. | |
| 2004/0076149 A1 * | 4/2004 | Parent et al. | 370/389 |
| 2004/0246991 A1 * | 12/2004 | Tsuzuki et al. | 370/466 |
| 2005/0076144 A1 * | 4/2005 | Boylan et al. | 709/245 |
| 2006/0126636 A1 * | 6/2006 | Dooley et al. | 370/395.3 |
| 2007/0180120 A1 | 8/2007 | Bainbridge et al. | |

OTHER PUBLICATIONS

"NetControl: IP Address Allocation & Utilization Management System", International Network Services. Oct. 2003.

* cited by examiner

*Primary Examiner*—Duc C Ho
(74) *Attorney, Agent, or Firm*—Carr & Ferrell LLP

(57) ABSTRACT

An Internet Protocol address manager creates data containers for managing Internet Protocol addresses. Each data container can store one or more address blocks of Internet Protocol addresses and includes a container policy for managing the address blocks. Additionally, the Internet Protocol address manager creates links between the data containers to organize the data containers into a container hierarchy. The Internet Protocol address manager can then allocate the address blocks or portions thereof among the data containers in the container hierarchy according to the container policies. Moreover, each data container can be associated with a network or subnet of a computer network. Further, the Internet Protocol address manager can allocate or assign multiple Internet Protocol addresses of multiple Internet Protocol versions to subnets or hosts in the computer network.

7 Claims, 15 Drawing Sheets

INTERNET PROTOCOL ADDRESS MANAGEMENT SYSTEM AND METHOD

CROSS-REFERENCE TO RELATED APPLICATIONS

This application is a continuation-in-part of U.S. patent application Ser. No. 11/011,473, entitled "Internet Protocol Address Management System and Method," filed Dec. 13, 2004, which is incorporated herein by reference.

BACKGROUND

1. Field of the Invention

The present invention relates generally to Internet Protocol addresses. More particularly, the present invention relates to systems and methods of managing Internet Protocol addresses.

2. Background Art

Internet Protocol (IP) registries are nonprofit organizations established to administer and register Internet Protocol (IP) addresses to the public. An example of a regional IP registry is the American Registry for Internet Numbers (ARIN). One administrative function of an IP registry is to process requests for IP addresses from individuals or organizations and to allocate IP addresses to these individuals and organizations. In previous years, the number of IP addresses available for allocation to the public has been plentiful. Because of the exponential growth of the Internet and the associated demand for IP addresses in more recent years, however, IP addresses have become scarce resources.

An organization, such as a corporation or an Internet Service Provider, will often request a block of consecutive IP addresses from an IP registry, and the IP registry will typically allocate the block of consecutive IP addresses to the organization. A system administrator then allocates portions of the IP address block to networks or subnets within the computer network, which is often performed in a multi-tiered hierarchical manner. Additionally, the system administrator selects IP addresses in the address block and assigns the IP addresses to network hosts and host devices in the network or subnet.

Often, the system administrator of the computer network inefficiently allocates portions of the IP address block to networks and subnets in the computer network. In some situations, the system administrator over-allocates a portion of the IP address block to a network or subnet to avoid running out of IP addresses for the network or subnet. Consequently, many IP addresses allocated to the network or subnet may be unassigned. In other situations, the system administrator of the computer network can under-allocate a portion of the IP address block to a network or subnet. Consequently, additional IP addresses are needed after the IP addresses allocated to the network or subnet are assigned to network hosts and host devices. Although the system administrator of the computer network can reallocate the address blocks among the networks and subnets, such a reallocation is a tedious and time-consuming process.

The allocation of IP addresses to networks and subnets in a computer network is further complicated by the existence of several IP versions, such as IP version 4 (IPv4) and IP version 6 (IPv6). Because the IP address space of IPv6 is substantially larger than the IP address space of IPv4, many networks, subnets and hosts in the Internet are slowly being migrated from IPv4 to IPv6. Moreover, these networks, subnets and hosts may require both IPv4 IP addresses and IPv6 IP addresses during the migration from IPv4 to IPv6.

In light of the above, there exists a need to manage IP addresses for a computer network. Additionally, there exists a need to manage IP addresses of multiple IP versions for the computer network.

SUMMARY OF THE INVENTION

An Internet Protocol (IP) address manager addresses the need for managing IP addresses for a computer network by creating data containers for storing and managing address blocks of IP addresses. Each data container can store zero or more address blocks of IP addresses and includes one or more container policies for managing the address blocks. In various embodiments, the data container includes container attributes for the data container and address block attributes for the address blocks to facilitate management of the address blocks. Further, the Internet Protocol address manager can create links between the data containers to form a container hierarchy including the data containers. The container hierarchy facilitates allocation of address blocks among the data containers and management of the address blocks stored in the data containers.

In another embodiment, the IP address manager addresses the need for managing IP addresses of multiple IP versions. In this embodiment, the IP address manager creates data containers for storing and managing multiple address blocks of IP addresses. Each of the address blocks in a data container can contain a different IP version of IP addresses. Further, the IP address manager can allocate an IP address from each address block in the data container to the same subnet or host of a computing network. In this way, the network, subnet or host can have IP addresses of multiple IP versions.

A data container, in accordance with one embodiment of the present invention, is capable of storing an address block including one or more IP addresses. Further, the data container includes at least one container policy for managing the address block. In a further embodiment, the data container is capable of storing multiple address blocks, each of which can store one or more IP addresses.

A method of managing IP addresses, in accordance with one embodiment of the present invention, includes creating a first data container capable of storing a first address block including one or more IP addresses. The method further includes creating one or more container policies for managing the first address block. In another embodiment, a second data container is created. The second data container is capable of storing a second address block including one or more IP addresses. One or more container policies are created for the second data container. Further, in this embodiment, a link is created between the first data container and the second data container to form a container hierarchy including the first and second data containers.

A system for managing IP addresses, in accordance with one embodiment of the present invention, includes a topology module that creates a data container capable of storing an address block including at least one IP address. In this embodiment, the topology module creates a container policy for managing the address block. In another embodiment, the topology module creates a plurality of data containers and links the data containers together into a container hierarchy.

A computer program product, in accordance with one embodiment of the present invention, includes computer program code for creating a data container capable of storing an address block including one or more Internet Protocol addresses of the same or multiple Internet Protocol versions.

Further, the computer program product includes computer program code for creating at least one container policy for managing the address block.

A system, in accordance with one embodiment of the present invention, includes a memory system configured to store an Internet Protocol address manager. The system further includes a processor coupled in communication with the memory system and configured to execute the Internet Protocol address manager to generate an electronic notification. The electronic notification indicates an allocation of an address block containing at least one Internet Protocol address. The system further includes an Internet interface coupled in communication with the processor and configured to send the electronic notification to an Internet Protocol Address Internet Registry via the Internet.

A data container, in accordance with one embodiment, is configured to store a first address block of a first IP version and a second address block of a second IP version. Further, the data container includes at least one container policy for managing the first address block and the second address block.

In a method in accordance with one embodiment, a data container is created. At least one container policy is created for the data container for managing a first address block of a first IP version and a second address block of a second IP version. The first address block and the second address block are allocated to the data container. In a further embodiment, a computer program product includes computer program code for performing the method.

A system, in accordance with one embodiment, includes a topology module configured to create a data container for storing a first address block of a first IP version and a second address block of a second IP version. The topology module is further configured to create a container policy for managing the first address block and the second address block.

DETAILED DESCRIPTION OF THE EMBODIMENTS

In one embodiment, an Internet Protocol address manager creates data containers for managing Internet Protocol addresses. Each data container is capable or storing one or more address blocks of Internet Protocol addresses and includes a container policy for managing any address block stored in the data container. In this embodiment, each network or subnet of a computer network is associated with a data container. Additionally, the Internet Protocol address manager can create links between the data containers to organize the data containers into a container hierarchy that corresponds to the hierarchical structure of the computer network. The Internet Protocol address manager can then allocate the address blocks or portions thereof among the data containers in the container hierarchy according to the container policies. The Internet Protocol address manager can also assign an Internet Protocol address contained in the address block of a data container to a network host or host device in the network or subnet associated with the data container.

In another embodiment, each data container can store multiple address blocks, each of which can contain a different IP version of IP addresses. Further, the Internet Protocol address manager can assign multiple IP addresses from the address blocks of a data container to a node (e.g., a network host or a host device) in the network or subnet associated with the data container. In this way, an IP address space for each IP version can be mapped to the computer network.

Figure 1:
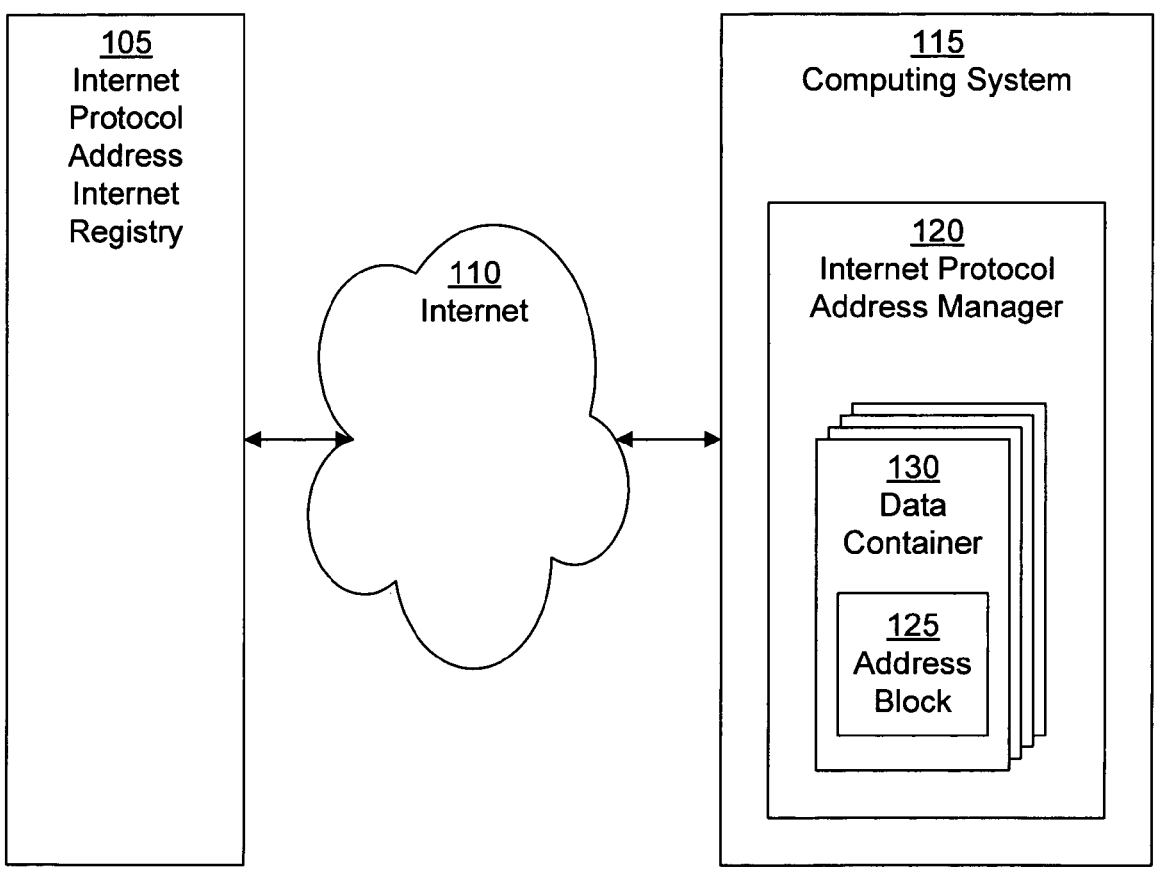
FIG. 1 is a block diagram of a computing environment in which an Internet Protocol address manager can be practiced, in accordance with one embodiment of the present invention.

FIG. 1 depicts an exemplary computing environment 100 in which an Internet Protocol (IP) address manager 120 can be practiced, in accordance with an embodiment of the present invention. The computing environment 100 includes an Internet Protocol Address Internet Registry (IR) 105 and a computing system 115 coupled together in communication via the Internet 110. The IR 105 manages IP addresses to be allocated to the public, as would be appreciated by one skilled in the art. For example, the IR 105 can be a regional IP registry or a local IP registry. In this embodiment, the computing system 115 includes the IP address manager 120. The IP address manager 120 manages IP addresses for a computer network, such as public IP addresses allocated by the IR 105 or private IP address usable by anyone, as would be appreciated by one skilled in the art. Moreover, the IP address manager 120 includes one or more data containers 130 for storing IP addresses. In one embodiment, each data container 130 can store one or more address blocks 125 of IP addresses. Moreover, the data containers 120 can be linked together in a hierarchical arrangement as is described more fully herein.

In one embodiment, the IP address manager 120 allocates an address block 125 to a data container 130 by storing the address block 125 into the data container 130, as is described more fully herein. Optionally, the IP address manager 120 then sends an electronic notification of the allocation to the IR 105 via the Internet 110. For example, the electronic notification can be an email message that specifies parameters for the allocation of the address block 125 to the data container 130. In further embodiments, the IP address manager 120 creates other data containers 130 and manages the data containers 130 and the address blocks 125 stored in the data containers 130, as is also described more fully herein.

Figure 2:
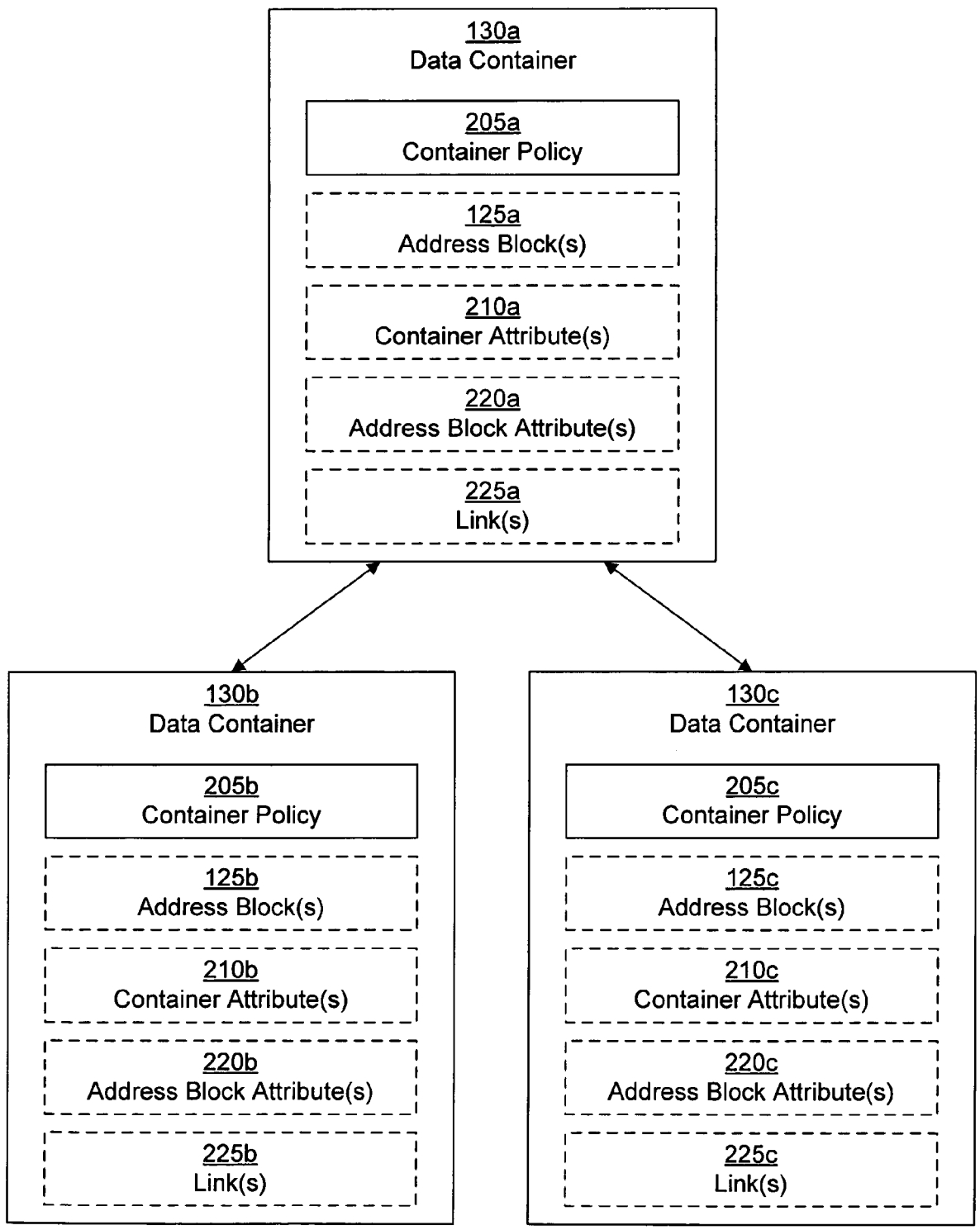
FIG. 2 is a block diagram of exemplary data containers, in accordance with one embodiment of the present invention.

FIG. 2 depicts exemplary data containers 130*a-c*, in accordance with one embodiment of the present invention. Each data container 130 is capable of storing one or more address blocks 125 allocated to the data container 130. Further, each data container 130 (e.g., data containers 130*a-c*) includes at least one container policy 205 (e.g., container policies 205*a-c*) created by the IP address manager 120. The container policy 205 of each data container 130 specifies a policy for managing an address block 125 stored in the data container 130, as is described more fully herein. For example, the container policy 205 of a data container 130 can specify a policy for allocating the address block 125 stored in the data container 130, or portion thereof, to another data container 130.

In a further embodiment, each data container 130 may include one or more container attributes 210 (e.g., container attributes 210*a-c*), and each address block 125 stored in the data container 130 can include one or more address block attributes 220 (e.g., address block attributes 220*a-c*). The container attributes 210 and address block attributes 220 facilitate management of address blocks 125 stored in the data container 130, as is described more fully herein.

In a further embodiment, a first data container 130 may include one or more links 225 (e.g., links 225*a-c*) that associate the first data container 130 with a second data container 130, and can represent a predetermined relationship between the first data container 130 and the second data container 130. For example, the link 225*a* of the first data container 130*a* can represent a parent-child relationship between the first data container 130*a* (i.e., a parent data container 130) and the second data container 130*b* (i.e., a child data container 130). Further, another link 225*b* in the second data container 130*b* can represent a child-parent relationship between the second data container 130*b* (i.e., the child data container 130) and the first data container 130*a* (i.e., the parent data container 130). Moreover, a plurality of data containers 130*a-c* associated with each other via a plurality of links 225*a-c* can form a container hierarchy 200, as depicted in FIG. 2. Although only three data containers 130 are shown in FIG. 2, alternative embodiments can comprise any number of data containers 130.

In one embodiment, the address blocks 125 stored in the container hierarchy 200 have an address block hierarchy. For example, an address block 125 stored in a parent data container 130 can include a range of IP addresses, and the address block 125 stored in each child data container 130 of the parent data container 130 can include a subset of the range of IP addresses contained in the address block 125 of the parent data container 130. In this way, an address block 125 of a parent data container 130 is subdivided into smaller address blocks 125 for the child data containers 130 of the parent data container 130. Similarly, the address blocks 125 of the child data containers 130 can be further subdivided among lower levels of the container hierarchy 200.

In one embodiment, each subnet of a computer network is associated with a data container 130 in the container hierarchy 200. In this embodiment, the container hierarchy 200 models the structure of the computer network. Moreover, an address block 125 stored in a data container 130 can be allocated to the subnet associated with the data container 130, and an IP address in the address block 125 can be assigned to a host (e.g., a workstation) in the subnet.

In a further embodiment, a data container 130 in the container hierarchy 200 can store multiple address blocks 125. In this embodiment, each of the address blocks 125 can store a different IP version of IP addresses. For example, a first address block 125 in the data container 130 can store IPv4 IP addresses and a second address block 125 in the data container 130 can store IPv6 IP addresses. In this example, a user of the IP address manager 120 can assign an IPv4 IP address in the first address block 125 to a host in the subnet. Further, the user can assign an IPv6 IP address in the second address block 125 to the host. In this way, the host can have both an IPv4 and an IPv6 IP address.

In another embodiment, a data container 130 can store an address block 125 containing multiple IP addresses of multiple IP versions. In this embodiment, a user of the IP address manager 120 can assign multiple IP addresses from the address block 125 to the same host in the subnet associated with the data container 130. For example, a user of the IP address manager 120 can assign both an IPv4 IP address and an IPv6 IP address from the address block 125 to a host in the subnet associated with the data container 130. In a further embodiment, the address blocks 125 containing IPv4 addresses model an IPv4 address space for the computer network and the address blocks 125 containing IPv6 model an IPv6 address space for the computer network.

Figure 3:
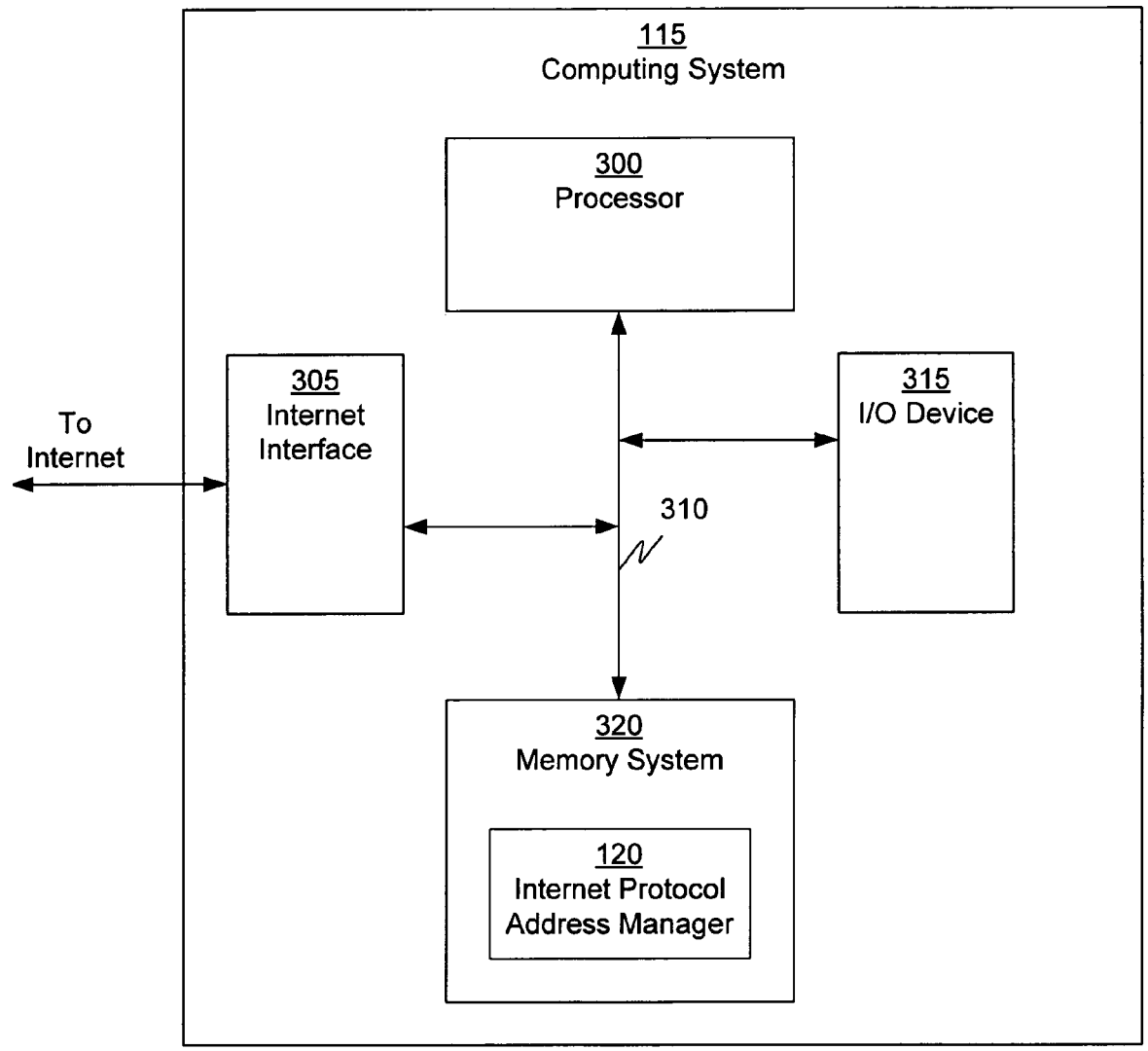
FIG. 3 is a block diagram of a computing system, in accordance with one embodiment of the present invention.

It is to be appreciated that assigning both an IPv4 IP address and an IPv6 IP address to the host facilitates transition of the host from IPv4 to IPv6. For example, the host can be configured for IPv4 and a user of the IP address manager 120 can assign an IPv4 IP address to the host. The host can then be configured for IPv6 and the user of the IP address manager 120 can assign an IPv6 IP address to the host. In this way, the host is transitioned from IPv4 to IPv6. Further, the user of the IP address manager 120 can unassign the IPv4 address in the first address block 125 from the host after the host is transitioned from IPv4 to IPv6. Moreover, once the computer network (e.g., subnets and hosts) is transitioned from IPv4 to IPv6, the capability of the computer network to execute IPv4 can be disabled or removed from the computer network FIG. 3 depicts an exemplary computing system 115, in accordance with one embodiment of the present invention. The computing system 115 includes a processor 300, an Internet interface 305, an input-output (I/O) device 315, and a memory system 320 coupled in communication with each other via a communication bus 310. As shown in FIG. 3, the memory system 320 contains the IP address manager 120. In this embodiment, the processor 300 executes the IP address manager 120 to generate the electronic notification, and provides the electronic notification to the Internet interface 305 via the communication bus 310. The Internet interface 305 transmits the electronic notification to the IR 105 (FIG. 1) via the Internet 110 (FIG. 1). Although the memory system 320 contains the IP address manager 120 in this embodiment, it is to be appreciated that the IP address manager 120 need not be contained in the memory system 320 in other embodiments. For example, the IP address manager 120 can be contained in the processor 300, the Internet interface 305, or the I/O device 315. As another example, the IP address manager 120 can be a computing device coupled in communication with the communication bus 310.

In various embodiments, the IP address manager 120 includes one or more software modules. Examples of software modules include a computer program, a software routine, binary code, and firmware, among others. Another example of a software module is a computer program product containing computer program code, such as a compact disc read-only memory (CD-ROM), a Digital Versatile Disc (DVD), or a memory storage device (e.g., a flash memory).

Figure 4:
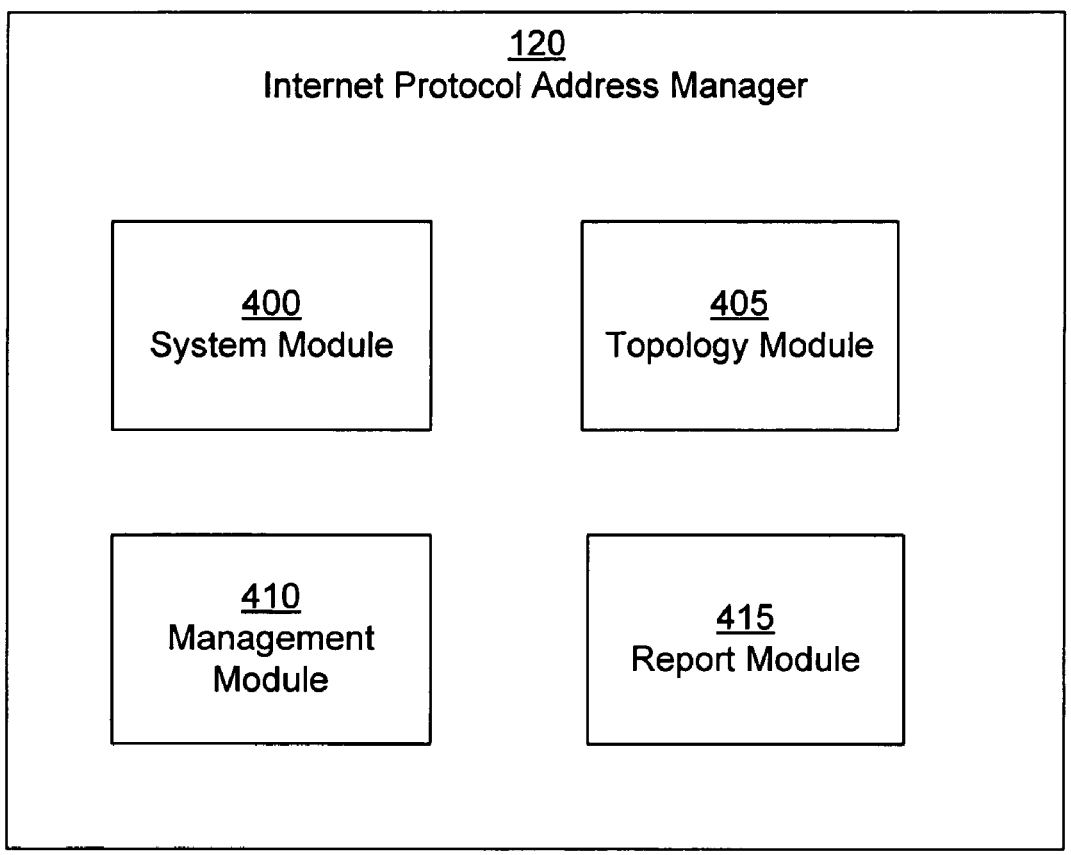
FIG. 4 is a block diagram of an IP address manager, in accordance with one embodiment of the present invention.

FIG. 4 depicts an exemplary IP address manager 120, in accordance with one embodiment of the present invention. The IP address manager 120 comprises a system module 400, a topology module 405, a management module 410, and a report module 415. In this embodiment, the system module 400 initializes the IP address manager 120 based on user input. For example, a user can use the system module 400 to define system parameters, such as the types of address blocks that can be stored in a data container 130 or reasons for allocating an address block to a data container 130. The topology module 405 creates data containers 130, edits the data containers 130, creates links 225 (e.g., links 225a-c shown in FIG. 2) between the data containers 130, and edits the links 225. Additionally, the topology module 405 creates container policies 205 (FIG. 2) for the data containers 130 and can create container attributes 210 (FIG. 2) for the data containers 130.

The management module 410 allocates address blocks 215 to the data containers 130 and creates address block attributes 220 (FIG. 2) for the address blocks 125, as is described more fully herein. The report module 415 generates reports for the data containers 130 and the address blocks 125 stored in the data containers 130. For example, the report module 415 can generate a report for each data container 130, which includes audit information pertaining to the data container 130. Alternative embodiments may comprise additional modules, fewer modules, or other modules than the exemplary IP address manager 120 depicted in FIG. 4.

Figure 5:
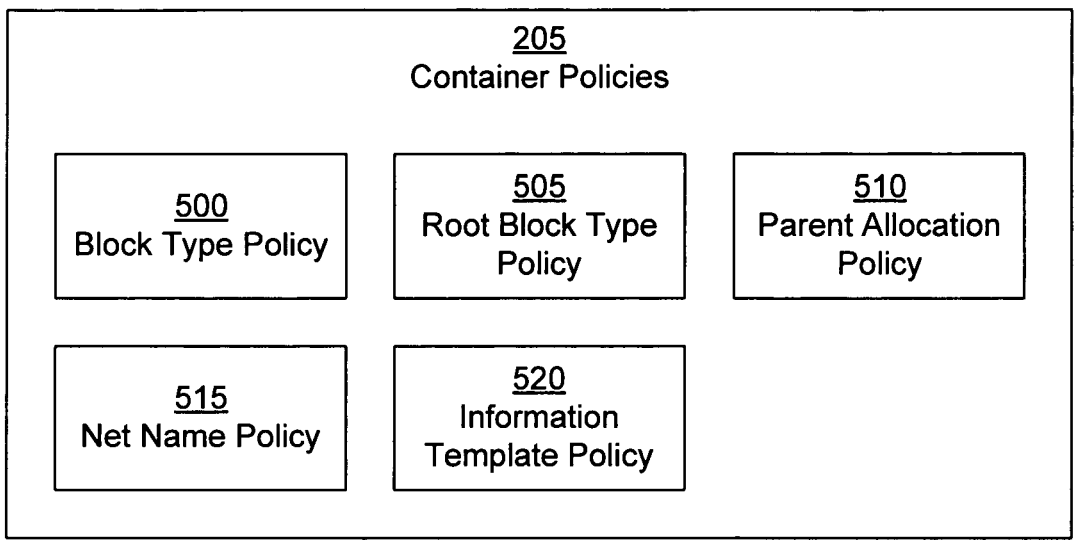
FIG. 5 is a block diagram of exemplary container policies.

FIG. 5 depicts exemplary container policies 205 of the data container 130 (FIG. 1). The exemplary container policies 205 comprise a block type policy 500, a root block type policy 505, a parent allocation policy 510, a net name policy 515, and an information template policy 520. Alternative embodiments may comprise additional container policies 205, fewer container policies 205, or other container policies 205.

The block type policy 500 specifies the block types of an address block 125 (FIG. 2) that can be stored in the data container 130. In various embodiments, the block type can be a data block type, a voice data block type, an IP version block type, or any block type defined by a user. For example, a system administrator can define a data block type specifying that the IP addresses in the address block 125 can be assigned to network hosts for general data applications. As another example, a system administrator can define a voice data block type specifying that the IP addresses in the address block 125 can be assigned to network hosts for Voice-Over-Internet Protocol (VoIP) devices. As still another example, a system administrator can define an IP version block type specifying that the IP addresses in the address block 125 can be assigned to network hosts using a specific IP version, such as IP version 4 (IPv4) or IP version 6 (IPv6). It is to be appreciated that the address block 125 stored in the data container 130 can have more than one block type in various embodiments of the present invention.

The root block type policy 505 specifies the type of a root address block 125 that can be added to the data container 130. For example, a root address block may include a block of IP addresses allocated by the IR 105 or the top level block for a selected private address space. The root block type can be any block type defined by a user, as is described more fully herein. It is to be appreciated that the root block type of the address block 125 allocated to the data container 130 need not be the same as the block type of the address block 125. For example, the root block type can be an IP version type specifying IPv6 and the block type can be a data block type specifying TCP. In this example, an address block 125 having an IP version type specifying IPv6 can be allocated to the data container 130. Once this address block 125 is allocated to the data container 130 (i.e., stored in the data container), an IP address in this address block can be assigned to a network host in the computer network that communicates by using IPv6 and TCP.

The parent allocation policy 510 specifies whether the data container 130 can request allocation of an address block 125 from a parent data container 130. In one embodiment, the data container 130 automatically requests the address block 125 from the parent data container 130 of the data container 130 in accordance with the parent allocation policy 510 when the data container 130 does not have sufficient IP addresses to assign to network hosts in the computer network.

The net name policy 515 specifies whether a network name is required for the address block 125 before the address block 125 or a portion of the address block 125 is allocated to a network or subnet in the computer network. The IP address manager 120 (FIG. 1) then provides the network name to the IR 105 (FIG. 1) once the address block 125 is allocated to the network or subnet. In one embodiment, the IP address manager 120 sends an email message identifying the address block 125 and the network name to the IR 105. In this way, the IP address manager 120 justifies the use of the address block 125 as may be required by the IR 105 before the IR 105 allocates additional address blocks 125 to an individual or an organization.

The information template policy 520 specifies whether an information template is to be associated with the data container 130 or the address block 125. The information template can include user defined fields that can store data input by a user of the IP address manager 120. For example, the information template can be a location template including one or more fields for specifying a geographic location of the computer network. In this example, the computer network can be a wide area network (WAN), and the geographic location can be the city in which a network or subnet of the WAN is located. Further, in this example, the address block 125 can be allocated to a network or subnet located at the geographic location.

Figure 6:
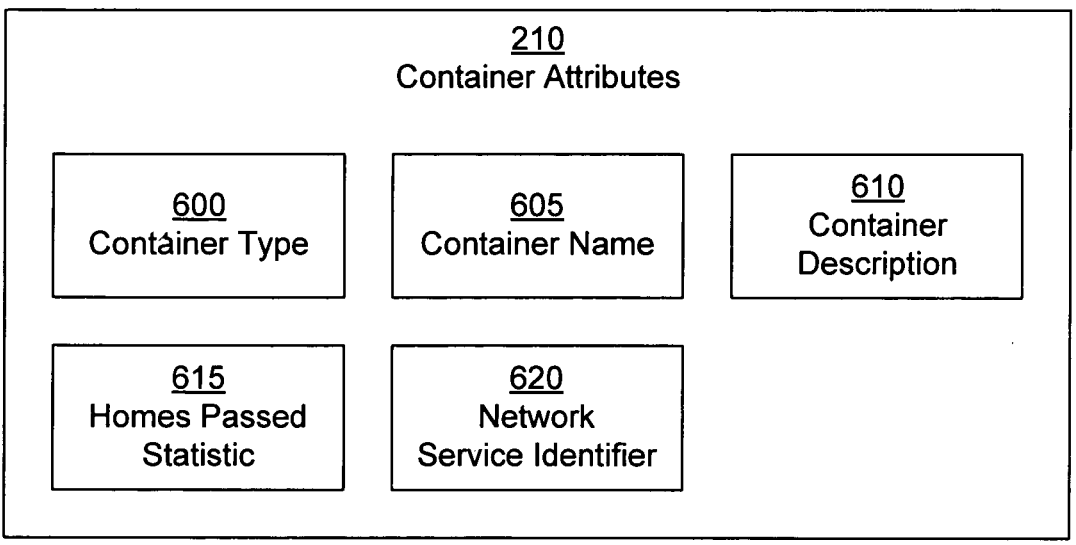
FIG. 6 is a block diagram of exemplary container attributes.

FIG. 6 depicts exemplary container attributes 210 in the data container 130 (FIG. 1). Each container attribute 210 includes information for the data container 130. The exemplary container attributes 210 comprises a container type 600, a container name 605, a container description 610, a homes passed statistic 615, and a network service identifier 620. The container attributes 210 facilitate management of the address blocks 125 (FIG. 2) in the IP address manager 120 (FIG. 1). It is to be appreciated that the container attributes 210 are optional in some embodiments of the present invention. Furthermore, alternative embodiments may comprise additional container attributes 210, fewer container attributes 210, or other container attributes 210.

The container type 600 specifies whether the data container 130 is a logical type or a device type. The logical type indicates that the data container 130 stores the address block 125 according to a logical organization of the computer network. For example, the computer network can be organized according to the topology or location of networks or subnets in the computer network. The device type indicates that the data container 130 is to store an address block 125 associated with a device organization of a computer network. For example, the computer network can be organized according to network hosts and host devices in the computer network.

The container name 605 specifies a name for identifying the data container 130. The IP address manager 120 can then use the container name 605 to manage the data container 130 and generate reports about the data container 130. For example, the container name 605 can be the name of a company division, the geographic location of a company office, or the name of a network host in a computer network.

The container description 610 specifies a description for the data container 130. For example, the data container 130 can store address blocks 125 for a company office at a particular geographic location. In this example, the container description 610 can include a textual description of the company office at the particular geographic location (e.g., "Headquarters").

The homes passed statistic 615 indicates homes that have access to a cable network in a geographic area. In one embodiment, the container name 605 specifies the geographic area and the homes passed statistic 615 specifies a number of homes in the geographic area that have access to the cable network. In another embodiment, the container name 605 specifies a geographic area and the homes passed statistic 615 specifies a percentage of homes in the geographic area that have access to the cable network. The homes passed statistic 615 allows a user of the IP address manager 120 to estimate the number of IP addresses to be allocated in the geographic area and to determine the size of an address block 125 to allocate to the data container 130.

The network service identifier 620 identifies a network service that is associated with the data container 130. In one embodiment, a user of the IP address manager 120 can associate a network service with the data container 130 (i.e., attach a network service to the data container 130) or disassociate a network service with the data container 130 (i.e., detach a network service to the data container 130). For example, a network service can be a Dynamic Host Configuration Protocol (DHCP) server that automatically assigns IP addresses to network hosts and host devices using DHCP.

Figure 7:
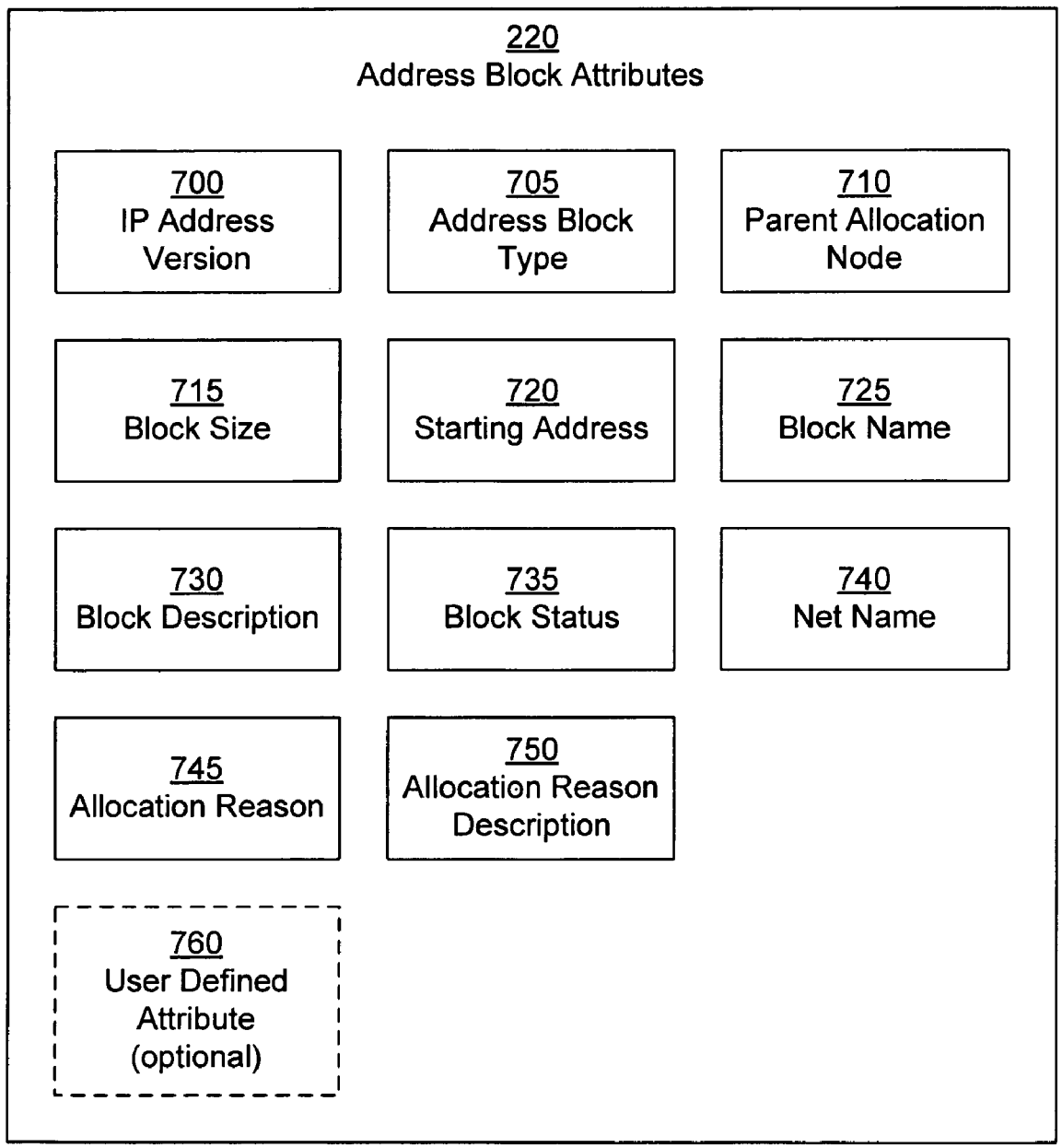
FIG. 7 is a block diagram of exemplary address block attributes.

FIG. 7 depicts exemplary address block attributes 220. Each of the address block attributes 220 contains information for an address block 125 (FIG. 2) stored in the data container 130 (FIG. 1). The exemplary address block attributes 220 comprise an IP address version 700, an address block type 705, a parent allocation node 710, a block size 715, a starting address 720, a block name 725, a block description 730, a block status 735, a net name 740, an allocation reason 745, an allocation reason description 750, and zero or more user defined attributes 760. The address block attributes 220 facilitate management of the address block 125 (FIG. 2) in the IP address manager 120 (FIG. 1). It is to be appreciated that the address block attributes 220 are optional in embodiments of the present invention. Further, alternative embodiments may comprise additional address block attributes 220, fewer address block attributes 220, or other address block attributes 220.

The IP address version 700 specifies an IP version of the address block 125. For example, the IP version can be IPv4 or IPv6, as would be appreciated by one skilled in the art. The address block type 705 specifies the type of IP addresses that are allowed in the address block 125. An example of the address block type 705 is a data block type or a voice data block type, as is described more fully herein. In one embodiment, the IP address manager 120 allows a user of the IP address manager 120 to select an IP address version 700 and an address block type 705 based on the block type policy 500 of a data container 130. The parent allocation node 710 specifies the address block 125 in the parent data container 130 from which the address block in the data container 130 was created.

The block size 715 specifies the size of the address block 125 stored in the data container 130, and the starting address 720 specifies a starting address of the address block 125. In one embodiment, the IP address manager 120 creates the block size 715 and the starting address 720 based on an address block 125 allocated to the data container 130 (i.e., stored in the data container). In another embodiment, a user specifies a block size 715 and a starting address 720 to create a second address block 125 based on a first address block 125 stored in the data container 130. In this embodiment, the user can use the IP address manager 120 to allocate the second address block 125 to another data container 130, such as a child data container 130. In this way, the first address block 125 can be divided into smaller address blocks 125, which can be allocated among the data containers 130 in the IP address manager 120.

The block name 725 specifies a name that identifies an address block 125 stored in the data container 130, and the block description 730 specifies a description of an address block 125. In this way, a user can quickly identify the address block 125 among multiple address blocks 125 stored in the data container 130. In one embodiment, the IP address manager 120 allows a user to select the address block 125 by using the block name 725.

The block status 735 indicates a status of an address block 125 stored in a data container 130. For example, the block status 735 can indicate whether the address block 125 is aggregate (e.g., available for further subdivision), reserved, deployed (e.g., allocated to a subnet), or assigned (e.g., fully assigned to a subnet). In one embodiment, a user of the IP address manager 120 can modify the block status 735 of the address block 125.

The net name 740 specifies a name that identifies the network or subnet of the computer network to which an address block 125 is to be allocated. In one embodiment, a user of the IP address manager 120 enters a name for the network or subnet of the computer network. In another embodiment, the net name policy 515 (FIG. 5) specifies whether a user is required to enter a net name 740 before creating an address block 125 or allocating the address block 125. In a further embodiment, the IP address manager 120 communicates the net name to the IR 105 (FIG. 1). For example, the IP address manager 120 can send an email message specifying the net name to the IR 105 via the Internet 110 (FIG. 1).

The allocation reason 745 specifies a reason for allocating an address block 125 to a data container 130 (e.g., a child data container 130) or to a network or subnet of the computer network. For example, the allocation reason 745 can specify why a network or subnet is added to the computer network (e.g., planned growth, emergency growth, or reallocation). In one embodiment, the IP address manager 120 includes predetermined allocation reasons 745 that a user of the IP address manager 120 can select via a pull-down menu. In a further embodiment, a user can define the allocation reasons 745.

The allocation reason description 750 also describes a reason for allocating the address block 125 to the other data container 130. In one embodiment, the allocation reason description 750 is a text entry that a user creates in the IP address manager 120. In this way, the user is not limited to a predetermined reason for allocating the address block 125 to the other data container 130.

The user defined attribute 760 specifies user supplied information for the address block 125 stored in the data container 130 based on the information template policy 520 of the data container 130. For example, a user of the IP address manager 120 can be an Internet Service Provider (ISP), and the user supplied information can be a customer name and customer identifier to which the address block 125 is assigned by the user. It is to be appreciated that a user can create multiple user defined attributes 760 for the address block 125 stored in the data container 130 by using the IP address manager 120. It is further to be appreciated that the user defined attribute 760 is optional in accordance with various embodiments of the IP address manager 120.

In one embodiment, a user of the IP address manager 120 can create one or more address block attributes 220 for a data container 130 to define an address space for the data container 130. For example, the user can create an address block type 705 and a block size 715 for the data container 130, which define the address space of the data container 130. As another example, the user can also create an IP address version 700 for the data container 130 to further define the address space. For example, the IP address version 700 can specify IPv4 or IPv6.

In another embodiment, the IP address manager 120 automatically allocates an address block 125 from a parent data container 130 to a child data container 130 based on the address block attributes 220 of the child data container 130 and in response to the creation of the address block attributes 220. For example, the IP address manager 120 can allocate the next available address space of an address block 125 in the parent data container 130 to the child data container 130 in response to the creation of the address block attributes 220. In a further embodiment, if the IP address manager 120 cannot allocate an address block 125 from the parent data container 130 to the child data container 130, the IP address manager 120 determines whether allocation of an address block 125 from a higher level data container 130 (e.g., a grandparent data container 130 of the child data container 130) is permitted based on the parent allocation policy of the parent data container 130. If permitted, the IP address manager 120 determines whether the higher level data container 130 contains an available address block 125 based on the address block attributes 220 of the child data container 130 and the higher level data container 120. The IP address manager 120 then allocates the address block 125 from the higher level data container 130 to the child data container 130 in response to the creation of the address block attributes 220.

Figure 8:
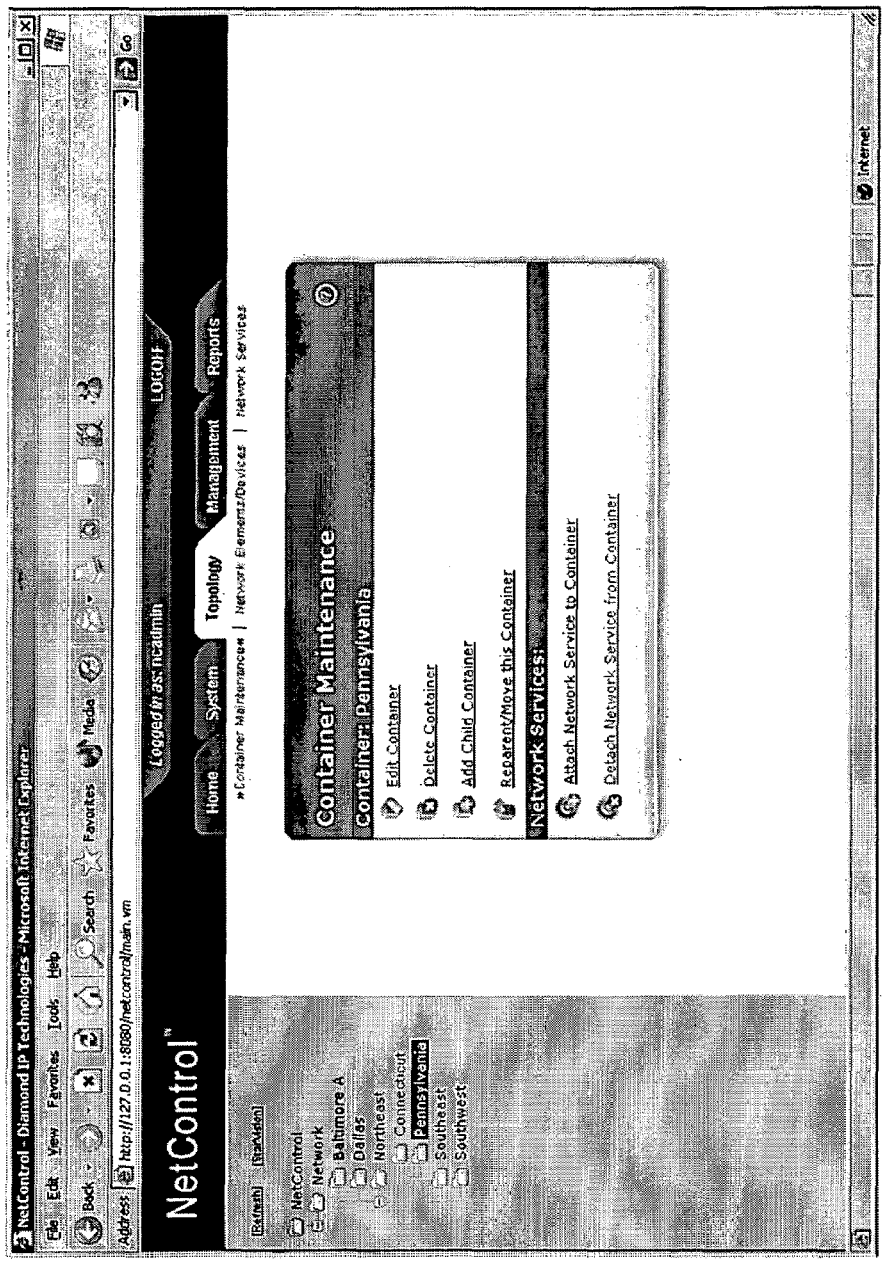
FIG. 8 is an exemplary screen shot of a graphical user interface generated by a topology module of the IP address manager.

FIG. 8 depicts an exemplary screen shot 800 of a graphical user interface generated by the topology module 405 (FIG. 4). As shown, the graphical user interface of the topology module 405 is running in a Microsoft Internet Explorer window. Further, the graphical interface includes links to submodules of the topology module 405 that allow a user of the IP address manager 120 (FIG. 4) to edit data containers 130 (FIG. 2), delete data containers 130, add child data containers 130, and edit links 225 (FIG. 2) to move data containers 130 within the container hierarchy 200 (FIG. 2). Although the graphical user interface of the topology module 405 is shown running in a Microsoft Internet Explorer window in FIG. 8, it is to be appreciated that other Web browsers (e.g., Netscape) can display the graphical user interface of the topology module 405.

Figure 9:
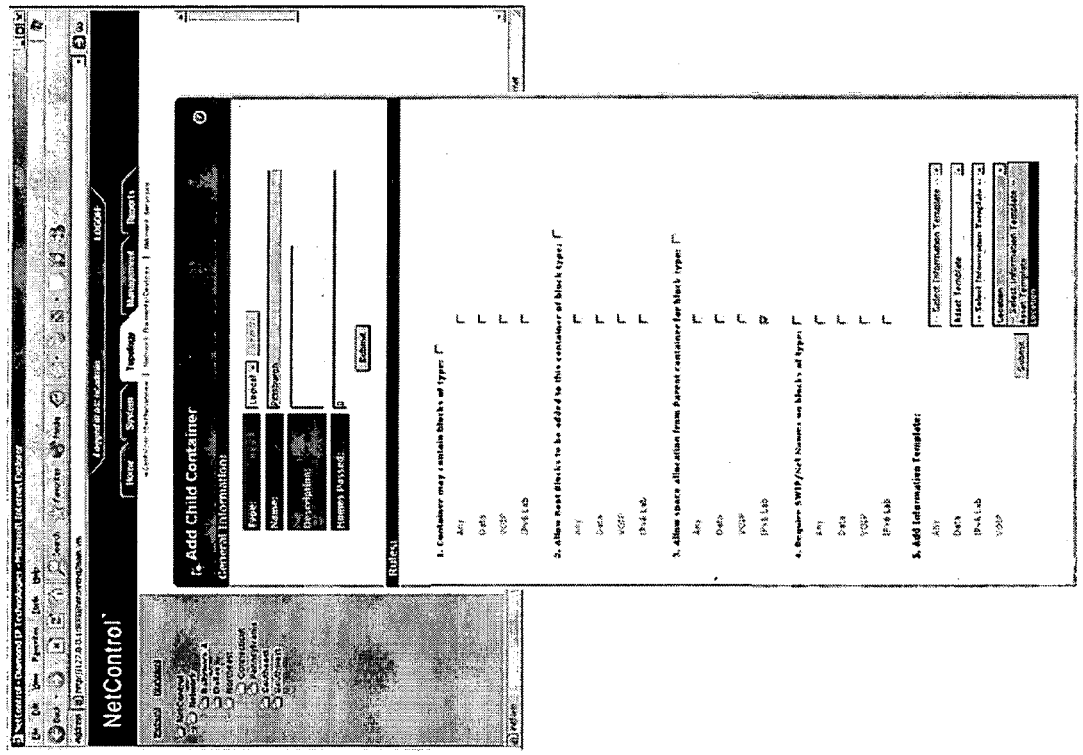
FIG. 9 is another exemplary screen shot of the graphical user interface generated by the topology module of the IP address manager.

FIG. 9 depicts another exemplary screen shot 900 of the graphical user interface generated by the topology module 405 (FIG. 4). The graphical user interface of FIG. 9 is a result of a user selecting the "add child container" link in the graphical user interface of FIG. 8. As shown, the graphical user interface of the topology module 405 is running in a Microsoft Internet Explorer window. Further, the graphical user interface includes pull-down menus, buttons, and fields that allow a user of the IP address manager 120 (FIG. 4) to select or create container policies 205 (FIG. 2) or container attributes 210 (FIG. 2) for a data container 130 (e.g., a child data container 130).

Figure 10:
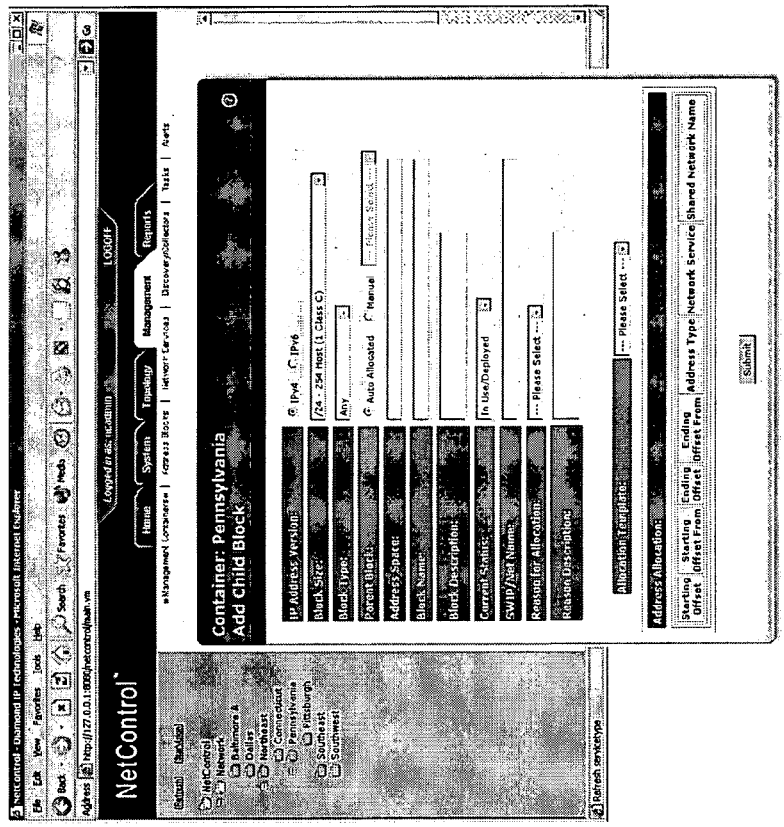
FIG. 10 is an exemplary screen shot of a graphical user interface generated by a management module of the IP address manager.

FIG. 10 depicts an exemplary screen shot 1000 of a graphical user interface generated by the management module 410 (FIG. 4). As shown in FIG. 10, the graphical user interface of the management module 410 is running in Microsoft Internet Explorer window. Further, the graphical user interface includes pull-down menus, buttons, and fields that allow a user of the IP address manager 120 to create or select address block attributes 220 (FIG. 2) for an address block 125 (FIG. 2) stored in the data container 130 (FIG. 2) and to allocate the address block 125 to a network or subnet in the computer network. Further, the user can create a second address block 125, based on the first address block 125 stored in the data container 130, and can allocate the second address block 125 to a network or subnet in the computer network. The graphical user interface also allows the user to assign an IP address in any address block 125 stored in the data container 130 to a network host or host device in the computer network during the block allocation process.

Figure 11:
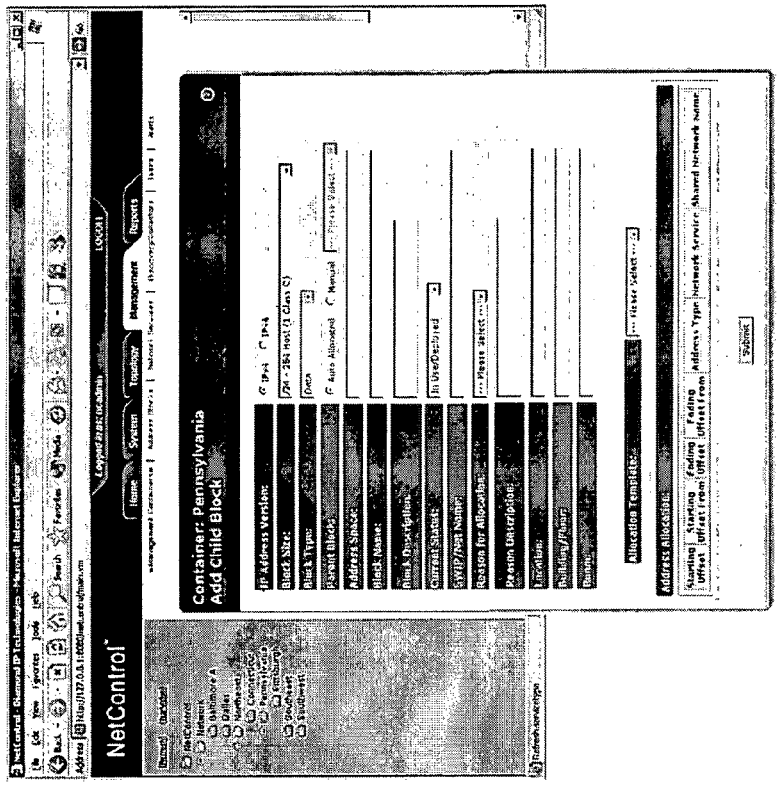
FIG. 11 is another exemplary screen shot of a graphical user interface generated by the management module of the IP address manager.

FIG. 11 depicts another exemplary screen shot 1100 of the graphical user interface generated by the management module 410 (FIG. 4). As shown in FIG. 11, the graphical user interface of the management module 410 is running in a Microsoft Internet Explorer window. In contrast to the graphical user interface of FIG. 10, the graphical user interface of FIG. 11 includes additional user-defined fields that allow a user to specify address block attributes 220 (FIG. 2) for a location, building, floor, and room of a network or subnet in the computer network. In one embodiment, the additional fields of the graphical user interface are based on the information template policy 520 (FIG. 5) of a data container 130 for a chosen block type (e.g., IP address version IPv4).

Figure 12:
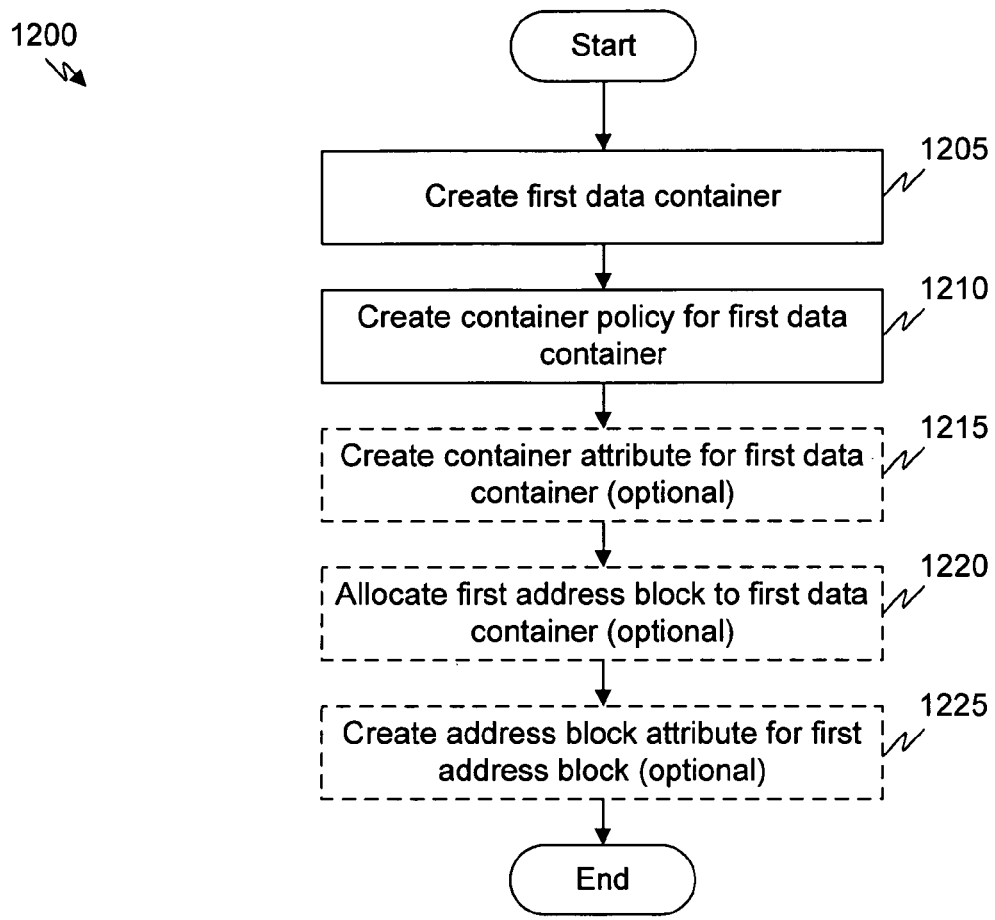
FIG. 12 is a flow chart of an exemplary method for managing IP addresses.

FIG. 12 depicts a flow chart 1200 of an exemplary method for managing IP addresses. In step 1205, the IP address manager 120 (FIG. 1) creates a first data container 130. In one embodiment, the topology module 405 (FIG. 4) of the IP address manager 120 creates the first data container 130 based on user input. For example, the user can select a button or link in the graphical user interface generated by the topology module 405 to create the first data container 130.

In step 1210, the IP address manager 120 creates a container policy 205 (FIG. 205) for the first data container 130. In one embodiment, the topology module 405 of the IP address manager 120 creates the container policy 205 for the first data container 130 based on user input. For example, the user can select the container policy 205 from a pull-down menu in the graphical user interface generated by the topology module 405 to create the container policy 205 for the first data container 130.

In step 1215, the IP address manager 120 creates a container attribute 210 (FIG. 2) for the first data container 130. In one embodiment, the topology module 405 (FIG. 7) of the IP address manager 120 creates the container attribute 210 for the first data container 130 based on user input. For example, the user can select the container attribute 210 from a pull-down menu in the graphical user interface generated by the topology module 405. It is to be appreciated that step 1215 is optional in various embodiments of the present invention.

In step 1220, the IP address manager 120 allocates a first address block 125 to the first data container 130. In one embodiment, the management module 410 of the IP address manager 120 allocates the first address block 125 to the first data container 130 by storing the address block 125 into the first data container 130 based on user input. In another embodiment, the IP address manager 120 notifies the IR 105 of the allocation by creating an email message specifying the details of the allocation and sending the email message to the IR 105 via the Internet 110. It is to be appreciated that step 1220 is optional in various embodiments of the present invention.

In step 1225, the IP address manager 120 creates an address block attribute 220 (FIG. 2) for the first address block 125. The address block attribute 220 specifies an attribute of the address block 125, as is described more fully herein. For example, the address block attribute 220 can be an address block type 705 (FIG. 7) or an IP address version 700 (FIG. 7).

In one embodiment, the management module 410 of the IP address manager 120 creates the address block attribute 220 for the first address block 125 based on user input. In an alternative embodiment, the management module 410 creates the address block attribute 220 for the first address block 125 based on the first container policy 205. In another embodiment, the first address block 125 must have at least one address block attribute 220 before the first address block 125 can be allocated to another data container 130 (e.g., a child data container 130).

It is to be appreciated that step 1225 is optional in various embodiments of the present invention. It is further to be appreciated that, in alternative embodiments, the steps 1205-1225 can be performed in a different order than the order described above and that steps 1205-1225 may be repeated to allocate additional address blocks 125 to the first data container 130.

Figure 13:
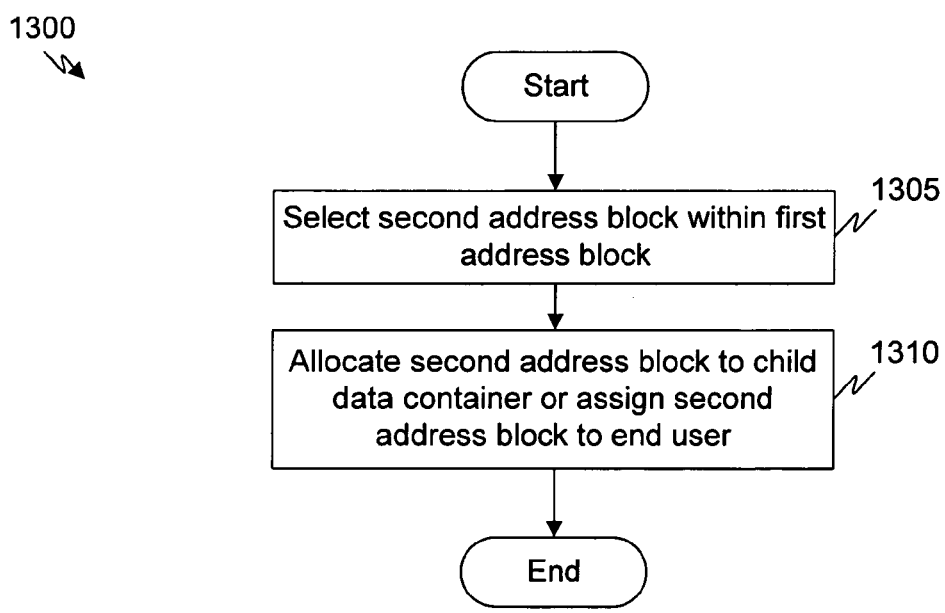
FIG. 13 is a flow chart of a portion of an exemplary method for managing IP addresses.

FIG. 13 depicts a flow chart 1300 of a portion of an exemplary method for managing IP addresses. In one embodiment, the portion of the exemplary method for managing the data container 130 depicted in the flow chart 1300 follows the method of managing a data container 130 depicted in the flow chart 1200 of FIG. 12.

In step 1305, the IP address manager 120 (FIG. 1) selects a second address block 130 having a range of IP addresses within the first address block 130 (i.e., the second address block 130 is a sub block of the first address block 130). In one embodiment, a user of the IP address manager 120 selects the second address block 130 based on address block attributes 220 of the first address block 130. For example, the first address block 130 can have a block size 715 (FIG. 7) and a starting address 720 (FIG. 7). In this example, the user selects a block size 715 for the second address block 125 that is equal to or smaller than the block size 715 of the first address block 130. Further, in this example, the user selects a starting address 720 for the second address block so that the second address block 125 is within the range of IP addresses in the first address block 125.

In step 1310, the IP address manager 120 allocates the second address block 125 to a child data container 130 or assigns the second address block 125 to an end user. In one embodiment, the management module 410 of the IP address manager 120 allocates the second address block to a child data container 130 based on user input. In another embodiment, the management module 410 assigns the second address block 125 to the end user based on user input. In this embodiment, the end user is a network or a subnet of a computer network. In another embodiment, the second address block 125 contains one IP address, and the management module 410 assigns the one IP address to the end user based on user input.

It is to be appreciated that steps 1305 and 1310 may be repeated any number of times to allocate an address block 125 within the first address block 125 to a child data container 130 in a container hierarchy 200 (FIG. 2) of data containers 130. Moreover, steps 1305 and 1310 may be repeated once again to assign the address block 125 in the child data container 130 to the end user.

Figure 14:
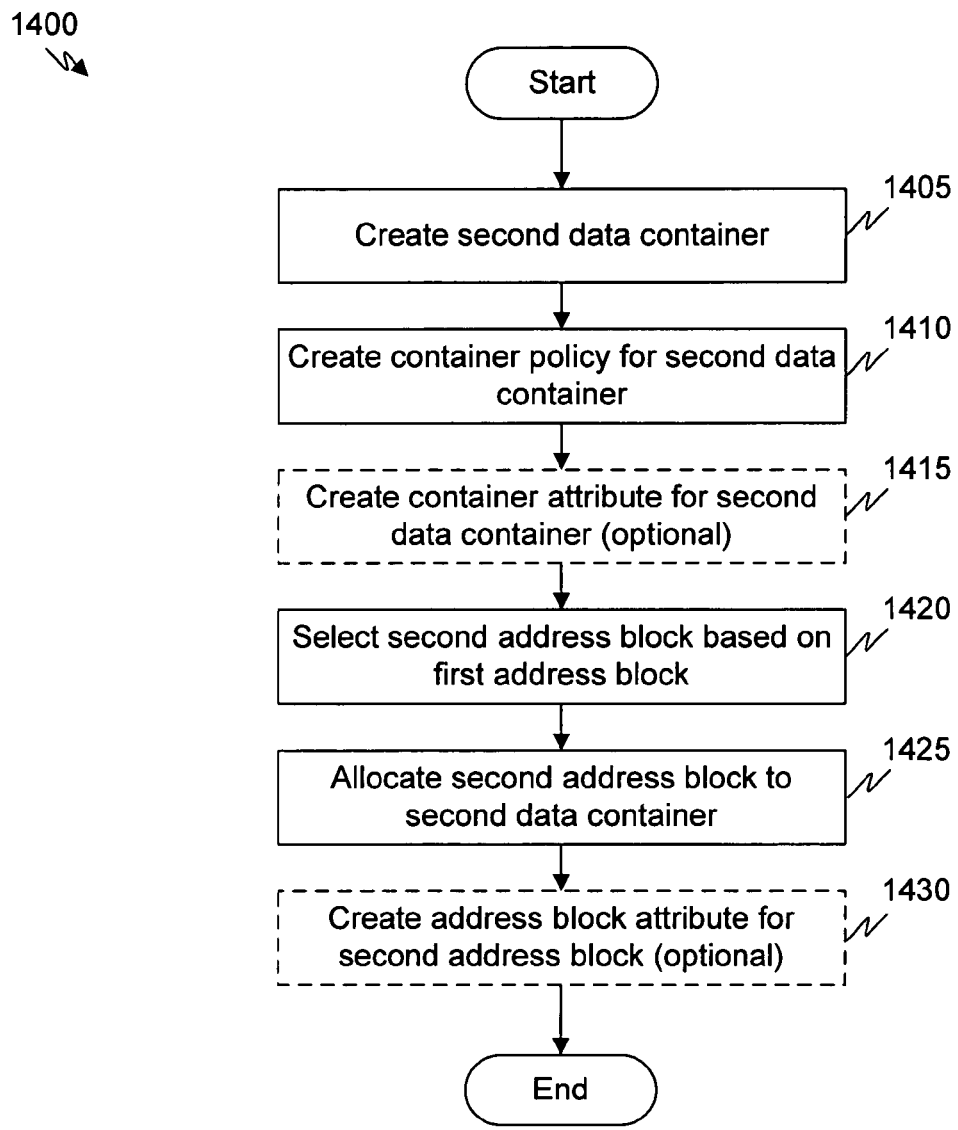
FIG. 14 is a flow chart of a portion of an exemplary method for managing IP addresses.

FIG. 14 depicts a flow chart 1400 of a portion of an exemplary method for managing IP addresses. In one embodiment, the portion of the method for managing a data container 130 depicted in the flow chart 1400 follows the method of managing a data container 130 depicted in the flow chart 1200 of FIG. 12.

In step 1405, the IP address manager 120 (FIG. 1) creates a second data container 130. As part of this process, the IP address manager 120 links the first data container 130 to the second data container 130. For example, the first data container 130 can be a parent data container 130 and the second data container 130 can be a child data container 130. In one embodiment, the topology module 405 (FIG. 4) of the IP address manager 120 creates the second data container 130 based on user input. For example, the user can select a link or button in the graphical user interface generated by the topology module 405 to create the second data container 130 and the links 225.

In step 1410, the IP address manager 120 creates a container policy 205 (FIG. 2) for the second data container 130. In one embodiment, the topology module 405 (FIG. 4) of the IP address manager 120 creates the container policy 205 for the second data container 130 based on user input. For example, the user can select the container policy 205 for the second data container 130 from a pull-down menu in the graphical user interface generated by the topology module 405.

In step 1415, the IP address manager 120 creates a container attribute 210 (FIG. 2) for the second data container 130. In one embodiment, the topology module 405 of the IP address manager 120 creates the container attribute 210 for the second data container 130 based on user input. For example, the user can select the container attribute 210 from a pull-down menu in the graphical user interface generated by the topology module 405. It is to be appreciated that step 1415 is optional in various embodiments of the present invention.

In step 1420, the IP address manager 120 selects a second address block 130 based on the first address block 130. The second address block 130 is a portion of the first address block 130 that is to be allocated to the second data container 130. In one embodiment, the management module 410 (FIG. 4) of the IP address manager 120 selects the second address block 130 within the first address block 130 based on user input, as is described more fully herein.

In step 1425, the IP address manager 120 allocates the second address block 130 to the second data container 130. In one embodiment, the management module 410 module of the IP address manager 120 allocates the second address block 125 to the second data container 130 by storing the second address block 130 into the second data container 130.

In step 1430, the IP address manager 120 creates an address block attribute 220 (FIG. 2) for the second address block 125. In one embodiment, the management module 410 of the IP address manager 120 creates the address block attribute 220 for the second address block 125 based on user input, as is described more fully herein. In an alternative embodiment, the management module 410 creates the address block attribute 220 for the second address block 125 based on the second container policy 205. In still another embodiment, the second address block 125 must have at least one address block attribute 220 before the IP address manager 120 can allocate the second address block 125 to the second data container 130. In this embodiment, step 1430 is performed before step 1425. It is to be appreciated that step 1430 is optional in various embodiments of the present invention. It is further to be appreciated that, in alternative embodiments, steps 1405-1430 can be performed in a different order than the order described above.

Figure 15:
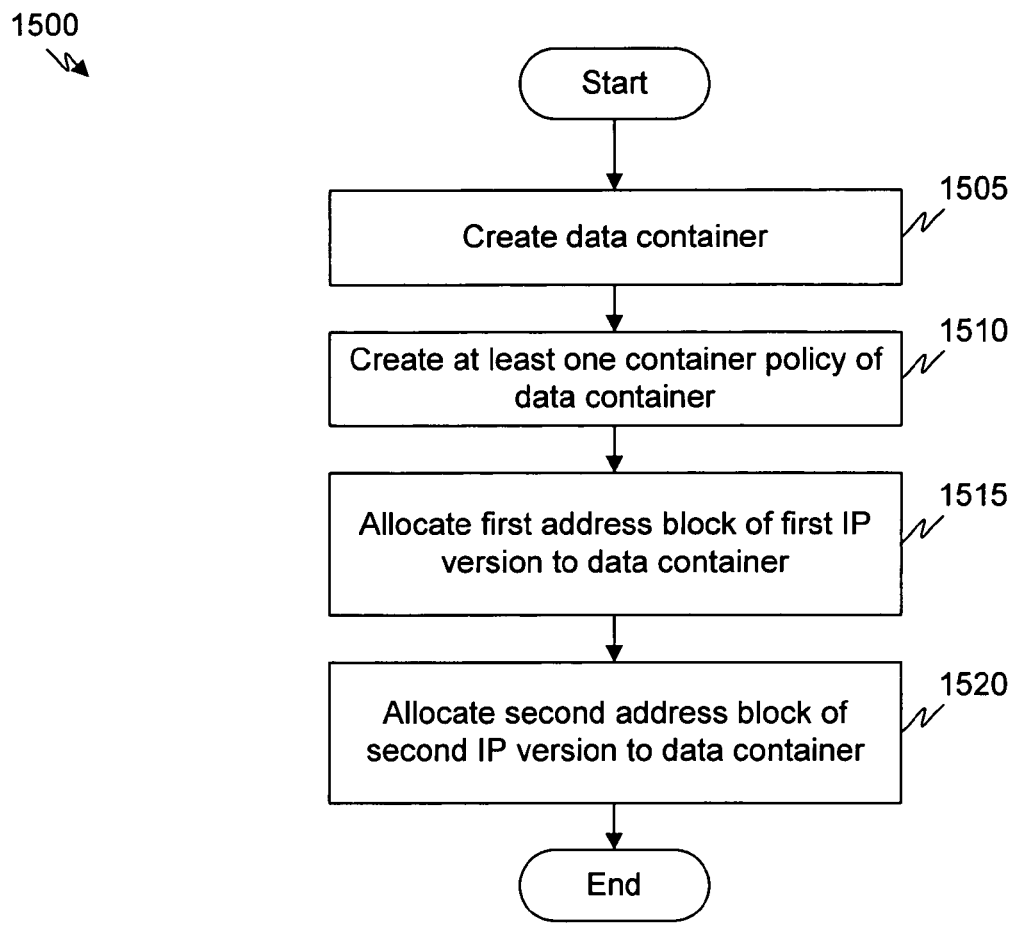
FIG. 15 is a flow chart of an exemplary method for managing IP addresses.

FIG. 15 depicts a flow chart 1500 of an exemplary method for managing IP addresses. In step 1505, the IP address manager 120 (FIG. 1) creates a data container 130 (FIG. 1). In one embodiment, the topology module 405 (FIG. 4) of the IP address manager 120 creates the data container 130 based on user input. For example, the user can select a button or link in the graphical user interface generated by the topology module 405 to create the data container 130.

In step 1510, the IP address manager 120 creates at least one container policy 205 (FIG. 205) of the data container 130. In one embodiment, the topology module 405 of the IP address manager 120 creates one or more container policies 205 for the data container 130 based on user input. For example, the user can assign a container policy 205 from a pull-down menu or checkbox in the graphical user interface generated by the topology module 405 to create the container policy 205 for the data container 130.

In step 1515, the IP address manager 120 allocates a first address block 125 (FIG. 1) of a first IP version to the data container 130. In one embodiment, the management module 410 (FIG. 4) of the IP address manager 120 allocates the first address block 125 to the data container 130 by storing the address block 125 into the data container 130 based on user input. In one embodiment, the first IP version is IPv4.

In step 1520, the IP address manager 120 allocates a second address block 125 of a second IP version to the data container 130. In one embodiment, the management module 410 of the IP address manager 120 allocates the second address block 125 to the data container 130 by storing the address block 125 into the data container 130 based on user input. In another embodiment, the second IP version is IPv6.

It is to be appreciated that, in various embodiments, the steps 1505-1520 can be performed in a different order than the order described above. It is further to be appreciated that, in various embodiments, one or more of the steps 1505-1520 may be repeated to allocate additional address blocks 125 to the data container 130 or create additional data containers 130.

Figure 16:
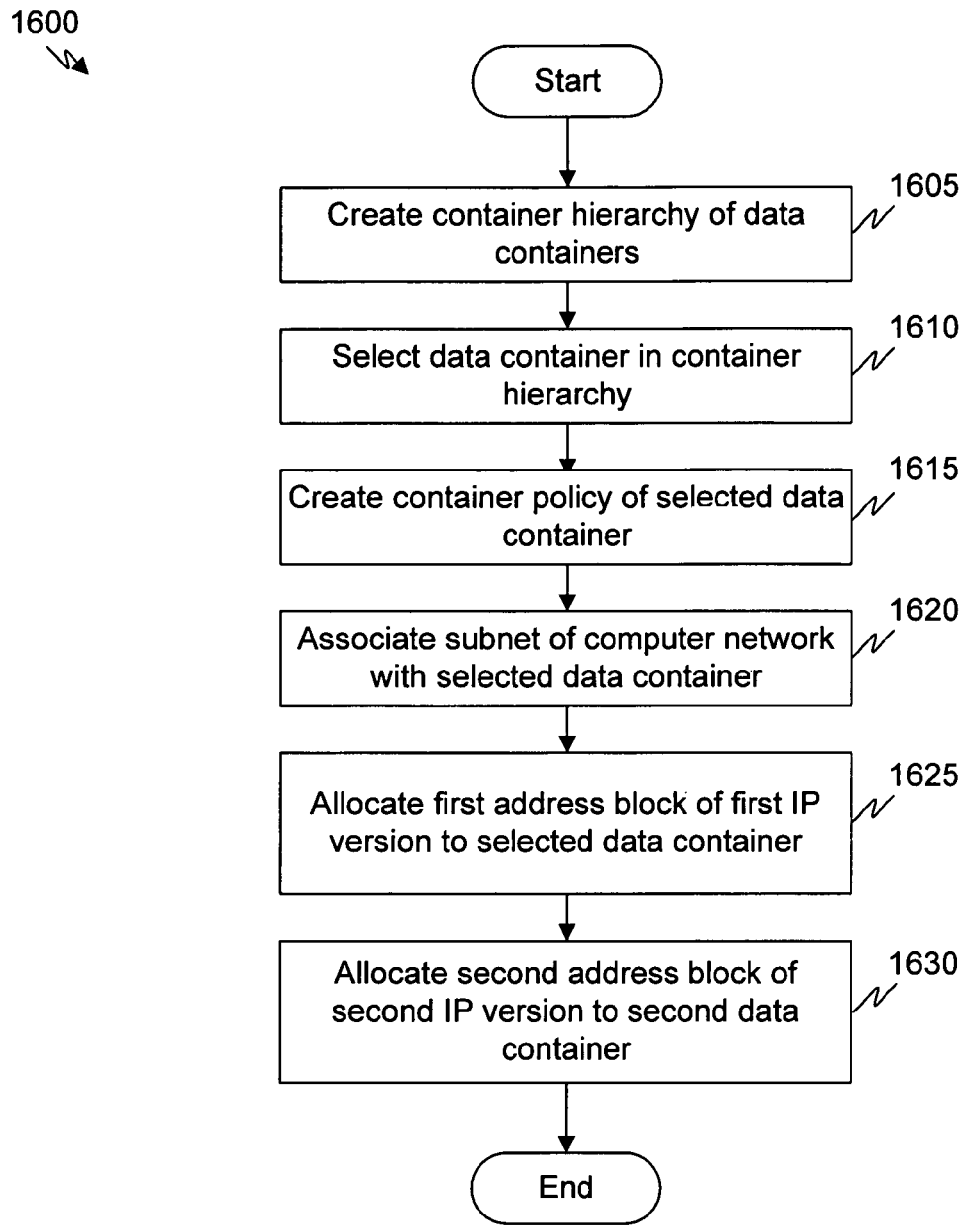
FIG. 16 is an alternative flow chart of an exemplary method for managing IP addresses.

FIG. 16 depicts a flow chart 1600 of an alternative exemplary method for managing IP addresses. In step 1605, the IP address manager 120 (FIG. 1) creates a container hierarchy 200 (FIG. 2) of data containers 130 (FIG. 2). In one embodiment, the topology module 405 (FIG. 4) of the IP address manager 120 creates the container hierarchy 200 based on user input. For example, the user can select a button or link in the graphical user interface generated by the topology module 405 to create the data containers 130 and link the data containers 130 together to form the container hierarchy 200.

In step 1610, the IP address manager 120 selects a data container 130 in the container hierarchy 200. In one embodiment, the topology module 405 of the IP address manager 120 selects the data container 130 based on user input.

In step 1615, the IP address manager 120 creates a container policy 205 (FIG. 2) for the data container 130. In one embodiment, the topology module 405 of the IP address manager 120 creates the container policy 205 for the data container 130 based on user input. For example, the user can assign the container policy 205 from a pull-down menu or checkbox in the graphical user interface generated by the topology module 405 to create the container policy 205 for the data container 130.

In step 1620, the IP address module 120 associates a subnet of a computer network with the selected data container 130. In one embodiment, the topology module 405 associates the subnet with the selected data container 130 based on user input. In a further embodiment, the topology module 405 associates each subnet of the computer network with a corresponding data container 130 in the container hierarchy 200. In this way, the container hierarchy 200 models the structure of the computer network.

In step 1625, the IP address manager 120 allocates a first address block 125 (FIG. 1) of a first IP version to the selected data container 130. In one embodiment, the management module 410 (FIG. 4) of the IP address manager 120 allocates the first address block 125 to the selected data container 130 based on user input.

In step 1630, a second address block 125 of a second IP version is allocated to the selected data container 130. In one embodiment, the IP address manager 120 allocates the second address block 125 to the selected data container 130 based on user input. In another embodiment, the first IP version is IPv4 and the second IP version is IPv6. In this embodiment, the selected data container 130 can contain both IPv4 IP and IPv6 addresses.

It is to be appreciated that, in various embodiments, steps 1605-1630 can be performed in a different order than the order described above. It is further to be appreciated that, in various embodiments, one or more of the steps 1605-1630 may be repeated to allocate additional address blocks 125 to the data container 130 or create additional data containers 130.

Figure 17:
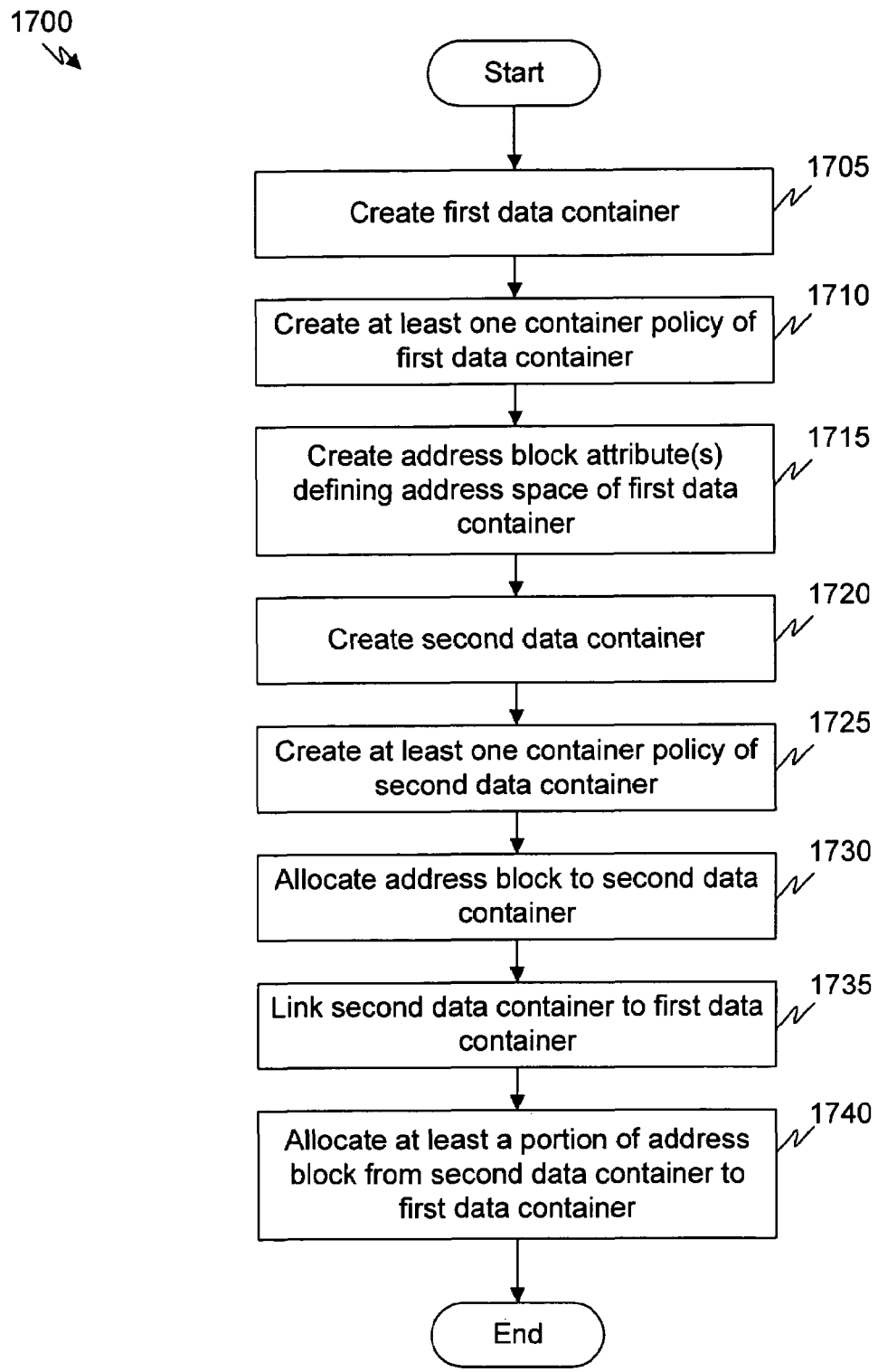
FIG. 17 is a further flow chart of an exemplary method for managing IP addresses.

FIG. 17 depicts a flow chart 1700 of a further exemplary method for managing IP addresses. In step 1705, the IP address manager 120 (FIG. 1) creates a first data container 130. In one embodiment, the topology module 405 (FIG. 4) of the IP address manager 120 creates the first data container 130 based on user input.

In step 1710, the IP address manager 120 creates at least one container policy 205 (FIG. 2) of the first data container 130. In one embodiment, the topology module 405 of the IP address manager 120 creates one or more container policies 205 of the first data container 130 based on user input. In another embodiment, the container policy 205 specifies that address blocks 125 (FIG. 1) of a first IP version (e.g., IPv4) and address blocks 125 of a second IP version (e.g., IPv6) can both be stored in the first data container 130.

In step 1715, the IP address manager 120 creates address block attribute(s) 220 (FIG. 2) defining an address space of the first data container 130. In one embodiment, the management module 410 (FIG. 4) of the IP address manager 120 creates the address block attribute(s) 220 based on user input. For example, the address block attribute(s) 200 can include an IP address version 700 (FIG. 7), an address block type 705 (FIG. 7), and a block size 715 (FIG. 7), which define the address space.

In step 1720, the IP address manager 120 creates a second data container 130. In one embodiment, the topology module 405 of the IP address manager 120 creates the second data container 130 based on user input.

In step 1725, the IP address manager 120 creates at least one container policy 205 of the second data container 130. In one embodiment, the topology module 405 of the IP address manager 120 creates one or more container policies 205 of the second data container 130 based on user input. In another embodiment, the container policy 205 of the second data container 130 specifies that address blocks 125 of a first IP version (e.g., IPv4) and address blocks 125 of a second IP version (e.g., IPv6) can both be stored in the second data container 130.

In step 1730, the IP address manager 120 allocates an address block 125 to the second data container 130. In one embodiment, the management module 410 module of the IP address manager 120 allocates the address block 125 to the second data container 130 by storing the address block 125 into the second data container 130 based on user input.

In step 1735, the IP address manager 120 links the second data container 130 to the first data container 130 such that the second data container 130 is a parent data container 130 of the first data container 130 (i.e., a child data container 130). In one embodiment, the topology module 405 of the IP address manager 120 links the second data container 130 to the first data container 130 based on user input.

In step 1740, the IP address manager 120 allocates at least a portion of the address block 130 from the second data container 130 to the first data container 130. In one embodiment, the management module 410 module of the IP address manager 120 automatically allocates the portion of the address block 125 from the second data container 130 to the first data container 130 by storing the portion into the first data container 130 in response to the creation of the address block attribute(s) 220 in step 1715. In this embodiment, the portion of the address block 125 allocated to the first data container 130 forms an address block in the first data container 130.

It is to be appreciated that, in various embodiments, steps 1705-1740 can be performed in a different order than the order described above. It is further to be appreciated that, in various embodiments, one or more of the steps 1705-1740 can be repeated to allocate additional address blocks 125 from the second data container 130 to the first data container 130.

The embodiments discussed herein are illustrative of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A system comprising a topology module configured to create a first data container for storing a first address block of a first Internet Protocol version and a second address block of a second Internet Protocol version, the topology module further configured to create a container policy for managing the first address block and the second address block and further configured to create a second data container, create at least one container policy for the second data container, and link the second data container to the first data container, the second data container being a parent data container of the first data container, and wherein a management module is further configured to allocate a third address block to the second data container, create at least one address block attribute for the second address block, and allocate the second address block to the first data container in response to the creation of the at least one address block attribute for the second address block, the second address block being at least a portion of the third address block.

2. The system of claim 1, the management module further configured to allocate the first address block and the second address block to the first data container.

3. The system of claim 1, wherein the management module is further configured to create at least one address block attribute for the first address block and at least one address block attribute for the second address block, the at least one address block attribute of the first address block specifying the first Internet Protocol version, the at least one address block attribute of the second address block specifying the second Internet Protocol version.

4. The system of claim 3, wherein the at least one address block attribute of the first address block defines a first Internet Protocol address space, and the at least one address block attribute of the second address block defines a second Internet Protocol address space.

5. The system of claim 3, wherein the at least one address block attribute of the first address block specifies a block size and an address block type of the first address block.

6. The system of claim 1, wherein the first Internet Protocol version in Internet Protocol version 4 and the second Internet Protocol version is Internet Protocol version 6.

7. The system of claim 1, wherein the first address block and the second address block are the same address block.

* * * * *

UNITED STATES PATENT AND TRADEMARK OFFICE
CERTIFICATE OF CORRECTION

PATENT NO. : 7,623,547 B2
APPLICATION NO. : 11/076730
DATED : November 24, 2009
INVENTOR(S) : Dooley et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1014 days.

Signed and Sealed this

Twenty-sixth Day of October, 2010

David J. Kappos
*Director of the United States Patent and Trademark Office*